United States Patent

[11] 3,624,694

| [72] | Inventor | Henry L. Byland<br>Lighthouse Point, Fla. |
|---|---|---|
| [21] | Appl. No. | 882,209 |
| [22] | Filed | Dec. 4, 1969 |
| [45] | Patented | Nov. 30, 1971 |
| [73] | Assignee | Futuristic Building Products Inc.<br>Northbrook, Ill. |

[54] REINFORCED STUD CONSTRUCTION
8 Claims, 5 Drawing Figs.

[52] U.S. Cl. ............................................... 52/241, 52/720
[51] Int. Cl. ............................................... E04c 3/32
[50] Field of Search .................................. 52/720, 238, 241, 732, 710, 721, 729, 481, 731; 182/219; 61/15; 40/140; 287/189.36 R

[56] References Cited
UNITED STATES PATENTS

| 1,360,720 | 11/1920 | Brown | 52/729 X |
| 2,265,443 | 12/1941 | McGuire | 52/721 X |
| 3,461,638 | 8/1969 | Balinski | 52/238 X |
| 3,504,465 | 4/1970 | Brinker | 52/238 |
| 3,517,474 | 6/1970 | Lanternier | 52/729 X |

FOREIGN PATENTS

| 789,785 | 1935 | France | 52/729 |

Primary Examiner—John E. Murtagh
Attorney—Hill, Sherman, Meroni, Gross & Simpson ABSTRACT: A reinforced stud construction for use in partitions of buildings, wherein a channel member has a base and side flanges with retainers at outer edges of the side flanges, and a stiffener fits in the channel with end edges of the stiffener providing backing for the channel's flanges to stiffen them for example when a screw or nail is being driven into the flange. The stiffener flexes resiliently when inserted into the channel so as to hold itself in place.

PATENTED NOV 30 1971 3,624,694
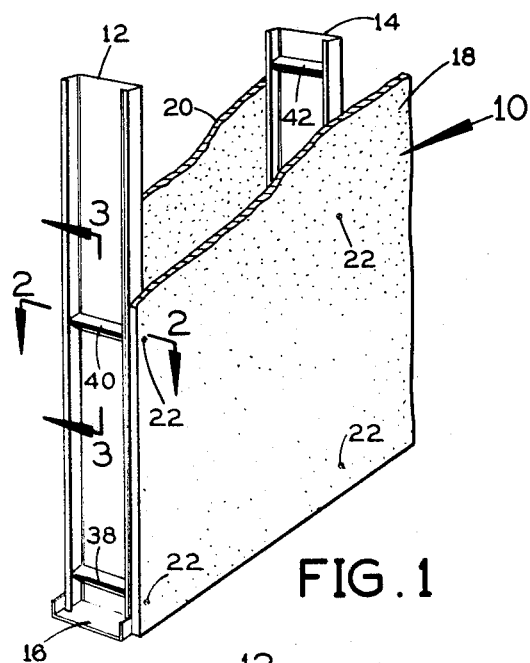
INVENTOR
HENRY L. BYLAND
BY
Settle and Oltman

REINFORCED STUD CONSTRUCTION

Partitions in buildings are sometimes constructed with metal studs which extend vertically between floor and ceiling and are retained with runners at top and bottom thereof. Panels such as gypsum board are fastened to the studs to form walls. The studs are channel members, and screws or nails are driven through the panels into flanges of the channels to fasten the panels in place. The flanges sometimes yield when a nail or screw is driven into them in this manner, and when this happens the nail or screw may not go through the stud, thus impairing the fastening.

It is an object of the present invention to stiffen channels used as studs in partitions without complicating the stud construction.

A further object of the invention is to provide backing for the flanges of a channel stud to allow screws or nails to be driven into the flanges without bending the flanges.

Another object of the invention is to reinforce a channel stud with a stiffener which can be inserted into the channel and holds itself in place.

Another object of the invention is to provide a reinforced stud construction utilizing a stiffener which can be fabricated easily and economically from sheet stock.

Other objects of this invention will appear from the following description and appended claims, reference being had to the accompanying drawings forming a part of this specification wherein like reference characters designate corresponding parts in the several views.

On the drawings:

FIG. 1 is a fragmentary perspective view of a portion of a partition provided with reinforced studs in accordance with the invention;

FIG. 2 is a sectional view taken along line 2—2 of FIG. 1;

FIG. 3 is a sectional view taken along line 3—3 of FIG. 1;

FIG. 4 is a perspective view of a stiffener for the stud; and

FIG. 5 is a fragmentary perspective view of a portion of a stud showing a stiffener before and after insertion into the stud.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

The partition 10 shown in FIG. 1 is constructed with metal studs 12 and 14 which extend from floor to ceiling, but only the lower portion of these studs is shown in FIG. 1. The studs are retained by a base channel 16 at their bottoms and they are retained by a similar top channel (not shown) at their tops. Panels 18 and 20 are fastened to opposite sides of the studs 12 and 14 by nails or screws, screws 22 being used in the illustrated embodiment. The studs may be fastened to the base channel 16 and also to the top channel (not shown) with screws or by other methods.

As shown particularly in FIGS. 2 and 5, the stud 12 (stud 14 being the same construction) is a channel-shaped member which has a back or base 24 and side flanges 26 and 28 perpendicular to the back 24. The side flanges 26 and 28 have retainer lips 30 and 32 projecting inwardly toward each other and at right angles to the flanges 26 and 28. The innermost edges of the lips 30 and 32 are bent back as at 34 and 36 so that the inner edges of the lips are rounded, but this is not essential.

The screws 22 which fasten the panels 18 and 20 to the flanges 26 and 28 must penetrate through the flanges as they are being driven. If no stiffening is provided inside the studs, the screws may bend the flanges inwardly as the screws are driven and this may prevent the screws from penetrating through the flanges and thus impair the fastening. Such bending of the flanges 26 and 28 is prevented in accordance with the invention by providing stiffeners inside the channel-shaped studs which back up the flanges 26 and 28 to hold them in place when screws are being driven into them, thus assuring that the screws or nails penetrate the flanges. Three such stiffeners 38, 40 and 42 are shown in FIG. 1, but it is to be understood that several such stiffeners may be provided in a given stud, the stiffeners being spaced along the length of the stud as needed to provide suitable backing for the flanges. In a particular example, five stiffeners are placed equidistantly along the length of 8 foot long studs.

One stiffener 40 is shown in FIGS. 2 through 5. The stiffener is a V-shaped metal member which has back or apex edge 42 and flat divergent wing flange sides 44 and 46 projecting from the back or apex edge 42 at an acute angle with respect to each other. Opposite the back or apex edge 42 are elongated edges 48 and 50, and the stiffener also has end edges 52, 54, 56 and 58. The corner 60 between edges 56 and 58 is cut out, and likewise the corner 62 between edges 52 and 54 is cut out as shown. The other corners of the stiffeners such as 64 are rounded.

The stiffener 40 fits in the channel member 12 with its apex edge 42 butting against both of the lips 30 and 32 on the inside face thereof. The edges 48 and 50, which are opposite the apex edge 42, butt against the base or back 24 of the channel stud 12. Although the stiffener is normally inserted in this orientation, it is to be understood that the stiffener could be provided in the reverse orientation wherein the apex edge 42 butts against the base 24 and the edges 48 and 50 butt against the lips 30 and 32. The end edges 52 and 54 butt against the inside face of flange 26, and the end edges 56 and 58 butt against the inside face of the other channel 28. The member 40 is very stiff in compression and therefore it provides solid backing for the flanges 26 and 28. Thus, when the screws 22 are driven into the flanges to fasten the panels 18 and 20 to the flanges, the stiffener 40 prevents the flanges from bending and allows the screws to penetrate relatively easily through the flanges. Likewise, the stiffener 40 will hold the flanges in place if nails are pounded into the flanges rather than screws being driven into the flanges. The stiffeners also give additional structural strength to the studs for general structural strength.

FIG. 5 illustrates a stiffener 40 above the studs 12 and shows the stiffener after it has been inserted inside the stud. The stiffener should be made of relatively resilient metal. The material could be spring steel, but spring quality steel is not essential so long as the material has considerable resilience. FIG. 5 shows in dashed lines how the sides 44 and 46 of the stiffener may flex apart from a normal condition wherein the distance between the apex 42 and a plane across the edges 48 and 50 is greater than the space between the inside face of the base 24 and the lips 30 and 32, to a condition wherein such dimension is the same as such space. The stiffener is flexed in this manner when it is inserted into the channel-shaped stud. The dimensions of the stiffener are such that the stiffener fits snugly in the channel stud and is held under tension in the flexed condition illustrated in FIG. 5. The resilient flexing apart of the sides of the stiffener causes a springback reaction which presses the edges 48 and 50 against the back 24 and also presses the apex edge 42 against the lips 34 and 36 so that the stiffener holds itself in place. The stiffener need not be inserted from an end of the channel; it can be inserted through the opening between the lips 30 and 32 and then turned slightly to put it into the position shown inside the stud in FIG. 5. In any event, the flexing action of the sides of the stiffener presses the edges 42, 48 and 50 of the stiffener firmly against the adjoining surfaces of the stud so that the stiffener holds itself in place; i.e., it is self-clamping.

The edges 52, 54, 56 and 58 fit snugly against the respective flanges 26 and 28, and thus support these flanges firmly to prevent them from being bent when nails are being driven into the flanges or when screws are screwed into the flanges.

The panels 18 and 20 may be of the type known as gypsum board, but other panels may be fastened to the studs if desired. The studs are preferably fabricated from forming quality steel which may be 0.020 inch thick, but the invention is not limited to this material.

Thus, the invention provides a reinforced stud construction which is easy to fabricate, and eliminates the problem of bending of the flanges of the stud when panels are fastened to the studs.

Having thus described my invention, I claim:

1. A reinforced stud construction comprising a metal channel member having a back and side flanges perpendicular thereto having outer edges with a retainer portion thereon, and at least one V-shaped stiffener member in said channel member having resilient sides projecting from an apex edge at an acute angle relative to each other, said V-shaped member fitting in said channel member with the apex edge and opposite edges of said sides butting against said back and said retainer portions, with said sides flexed to press said edges against the adjoining surfaces and thereby hold said V-shaped member in place, said V-shaped member having end edges providing backing for said flanges to stiffen the same.

2. In a partition of a building, the combination including a plurality of vertical studs retained between floor and ceiling, said studs each comprising a metal channel member having a back and side flanges perpendicular thereto, the edges of the side flanges each having a retainer lip thereon, and stiffening means in each of said studs comprising a plurality of V-shaped members having resilient sides projecting from an apex edge at an acute angle relative to each other, said V-shaped members fitting in the respective channel member with the apex edge and the opposite edges of said sides butting against said lips and said back and with said sides in a flexed condition to press said edges against the adjoining surfaces and thus hold said V-shaped members in place, said V-shaped members having end edges providing backing for said flanges.

3. In a partition of a building, a reinforced stud construction comprising a stud providing structural support for panel means of the partition, means fastening the panel means to the stud, said stud comprising a metal channel member having a back and side flanges perpendicular thereto having outer edges with a lip thereon, the panel means abutting said side flanges and the fastener means anchored to a side flange, and stiffening means in said stud comprising a V-shaped member having resilient sides projecting from an apex edge at an acute angle relative to each other, said V-shaped member fitting in said channel member with the apex edge and opposite edges of said sides butting against said lips and said back, and with said sides flexed to press said edges against the adjoining surfaces and thereby hold said V-shaped member in place, said V-shaped member having end edges providing backing for said flanges to stiffen the same.

4. A reinforced stud construction comprising:
a channel member having a base and side flanges with inturned lips on outer edges of said side flanges; and
at least one generally V-shaped stiffener in said channel member having a back and divergent resiliently deflectable wing flanges projecting from said back;
said wing flanges having end edges at opposite longitudinal ends thereof and the stiffener fitting in said channel member with said end edges providing backing for said side flanges to stiffen the same, and said wing flanges under springback tension maintaining the stiffener in place by gripping engagement with said base and lips.

5. A construction according to claim 4, said back engaging said lips and said wing flanges having side edges which engage said base, said wing flanges being sprung from a normal condition, in which said back and said side edges extend to a greater distance than the space between said base and said lips, to effect said springback tension.

6. A construction according to claim 4, including clearance cutouts at the opposite ends of said back of the stiffener.

7. In reinforcement for a stud construction comprising a channel member having a base and side flanges within inturned lips on outer edges of the side flanges:
a generally V-shaped stiffener having a back and divergent resiliently deflectable wing flanges projecting from said back with end edges on said flanges adapted to engage in backing relation within and against said stud side flanges to stiffen the same; and
said wing flanges normally diverging to a distance from said back which is greater than the space between the inside of said lips and said base of the channel and being resiliently deflectable apart to a spacing between said back and a plane across free edges of said wing flanges which is substantially equal to said spacing between said base and said lips whereby said back and said free edges are engageable in gripping relation with the channel between said base and said lips for self-retaining of the stiffener in the channel.

8. Reinforcement according to claim 7, wherein said stiffener has clearance cutouts at the opposite ends of said back.